(12) United States Patent
Tender et al.

(10) Patent No.: US 9,674,804 B2
(45) Date of Patent: Jun. 6, 2017

(54) APPARATUS AND METHOD FOR SYNCHRONIZING COMMUNICATION BETWEEN SYSTEMS WITH DIFFERENT CLOCK RATES

(71) Applicant: Hughes Network Systems, LLC, Germantown, MD (US)

(72) Inventors: Neil H. Tender, Germantown, MD (US); Yash Vasavada, Germantown, MD (US); Deepak Arur, Germantown, MD (US); Tariq Muhammad, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 178 days.

(21) Appl. No.: 14/584,652

(22) Filed: Dec. 29, 2014

(65) Prior Publication Data
US 2016/0192303 A1    Jun. 30, 2016

(51) Int. Cl.
*H04W 56/00* (2009.01)
*H04B 7/185* (2006.01)

(52) U.S. Cl.
CPC ...... *H04W 56/001* (2013.01); *H04B 7/18513* (2013.01)

(58) Field of Classification Search
None
See application file for complete search history.

(56) References Cited

U.S. PATENT DOCUMENTS

| | | | | |
|---|---|---|---|---|
| 3,818,453 A * | 6/1974 | Schmidt | ............... | H04B 7/2125 370/324 |
| 5,130,952 A * | 7/1992 | Feintuch | ................. | G01S 11/14 367/135 |
| 5,175,556 A * | 12/1992 | Berkowitz | ............. | H01Q 1/288 342/354 |
| 5,572,216 A * | 11/1996 | Weinberg | ............... | H01Q 1/288 342/357.2 |
| 5,732,044 A * | 3/1998 | Jarvis | ..................... | H04B 11/00 367/134 |
| 2004/0033780 A1* | 2/2004 | Kelly | ................. | H04B 7/18519 455/11.1 |
| 2005/0007277 A1* | 1/2005 | Iancu | ..................... | G01S 19/29 342/418 |
| 2007/0053373 A1* | 3/2007 | FitzGerald | ............. | H04L 12/43 370/412 |
| 2007/0211670 A1* | 9/2007 | Andersson | ........ | H04W 72/1257 370/335 |

(Continued)

*Primary Examiner* — Ayaz Sheikh
*Assistant Examiner* — Tarell Hampton
(74) *Attorney, Agent, or Firm* — Nath, Goldberg & Meyer; Leonid D. Thenor

(57) ABSTRACT

An apparatus and method for synchronizing communication between systems having different clock rates, is described. The apparatus includes a communication unit, a synchronization unit, and an interface unit. The communication unit receives upstream information and generates a first sample stream representative of the upstream information based on a first clock rate. The synchronization unit converts the first sample stream to a second sample stream based on a second clock rate and in accordance with a predetermined burst plan. The interface unit receives the second sample stream at the second clock rate and outputs it based on the predetermined burst plan.

29 Claims, 11 Drawing Sheets

(56) References Cited

U.S. PATENT DOCUMENTS

| | | | |
|---|---|---|---|
| 2007/0223605 A1* | 9/2007 | Voltz | H04L 27/2672 |
| | | | 375/260 |
| 2007/0233383 A1* | 10/2007 | Churan | G01S 19/21 |
| | | | 701/469 |
| 2007/0281612 A1* | 12/2007 | Benjamin | H04B 7/18515 |
| | | | 455/13.3 |
| 2009/0052582 A1* | 2/2009 | Oren | H04L 27/2647 |
| | | | 375/319 |
| 2015/0046952 A1* | 2/2015 | Beals | H04H 60/51 |
| | | | 725/68 |
| 2016/0192311 A1* | 6/2016 | Tender | H04W 56/0055 |
| | | | 370/316 |

* cited by examiner

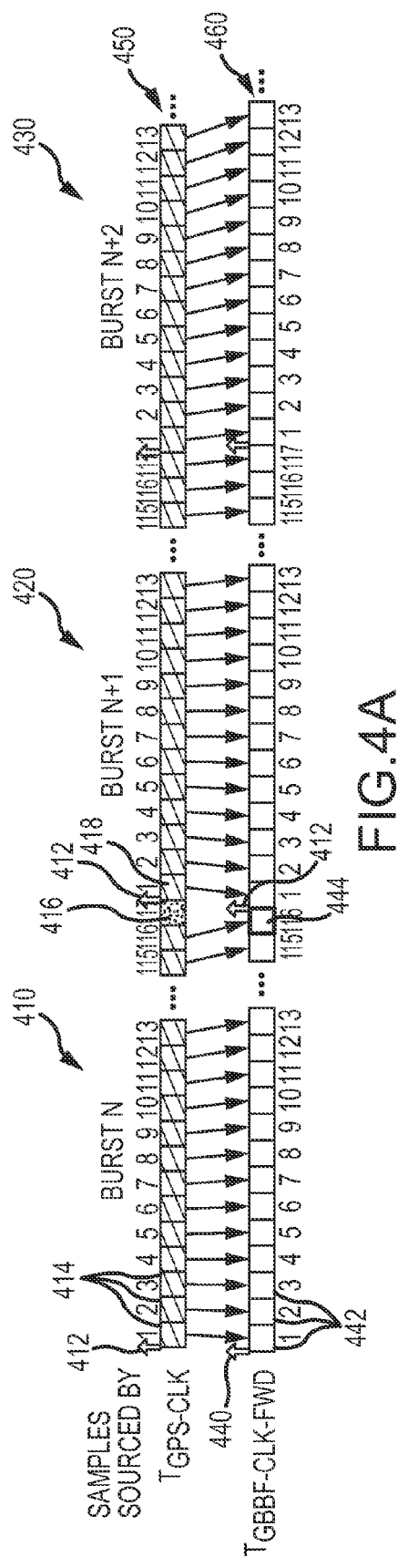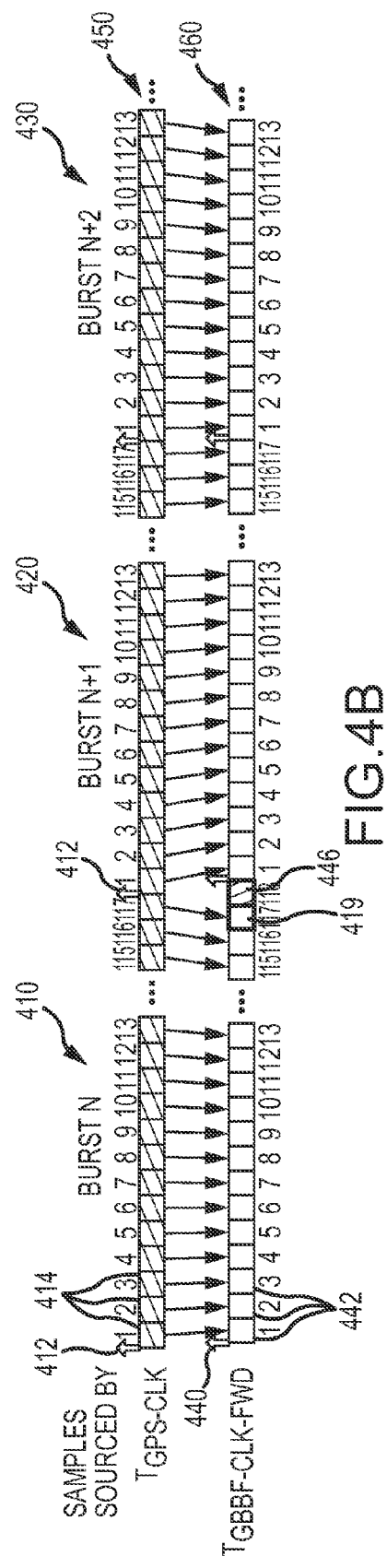

APPARATUS AND METHOD FOR SYNCHRONIZING COMMUNICATION BETWEEN SYSTEMS WITH DIFFERENT CLOCK RATES

BACKGROUND INFORMATION

A growing trend in communications systems is the continuous increase of feature rich content desired by consumers. For example, consumers rely on communication systems to deliver services that transmit a large quantity of data in addition to traditional voice communication. The data can include complex graphics or images, audio, video, etc. As the number of users and services increase, it becomes necessary for service providers to upgrade infrastructure and services to accommodate user demands.

Communication systems utilized by such service providers must be capable of operating at high speeds while also having sufficient capacity to carry the quantity of data necessary to deliver desired services. Such systems rely on proper timing and synchronization to ensure information is properly transmitted and received. Improper synchronization can result in various errors, delays, and/or possibly complete loss of information, ultimately resulting in user dissatisfaction. For example, excessive delays in data delivery can result in increased wait time for users to receive desired content because of loss and subsequent retransmission of data. This can increase costs for users who subscribe to, for example, services based on time and/or data quantity. Such delays can manifest as dropped voice calls or the inability to access data services. Furthermore, a large number of users may contact the service provider to report the problem, thus requiring the presence of sufficient customer service representatives.

When multiple systems operating on different timing clocks are required to communicate with each other, it can be difficult to obtain proper timing. For example, communication may be required between two systems that are proprietary to different service providers. While each system may individually function within the constraints of a particular protocol such as, for example, Time Division Multiple Access (TDMA), there may sometimes be instances where timing variations between the two systems exceed the protocol constraints. It is therefore desirable to properly synchronize communication between systems which operate on different timing clocks.

BRIEF SUMMARY

An apparatus and method for synchronizing communication between systems having different clock rates are described. According to an embodiment, the apparatus includes a communication unit for receiving upstream information and generating a first sample stream representative of the upstream information and based on a first clock rate. A synchronization unit is provided for converting the first sample stream to a second sample stream, based on a second clock rate. The synchronization unit configures the second sample stream as a plurality of sequential bursts arranged in accordance with a predetermined burst plan. The apparatus also includes an interface unit for receiving the second sample stream at the second clock rate and outputting the second sample stream in accordance with the predetermined burst plan. According to the embodiment, the first clock rate is different from the second clock rate. Further, the first sample stream is converted based, at least in part, on predetermined guard periods within the first sample stream.

According to another embodiment, a method includes generating a first sample stream representative of received upstream information, the first sample stream being based on a first clock rate; converting the first sample stream, using a synchronization unit, to a second sample stream based on a second clock rate, the second sample stream being configured as a plurality of sequential bursts arranged in accordance with a predetermined burst plan; and outputting the second sample stream, by an interface unit, in accordance with the predetermined burst plan. According to the embodiment, the first clock rate is different from the second clock rate, and the converting is performed based, at least in part, on predetermined guard periods within the first sample stream.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 4A is a diagram illustrating the details of converting a first sample stream to a second sample stream, in accordance with an embodiment;

FIG. 4B is a diagram illustrating the details of converting a first sample stream to a second sample stream, in accordance with at least one embodiment;

DETAILED DESCRIPTION

An apparatus and method for synchronizing communication between systems having different clock rates are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
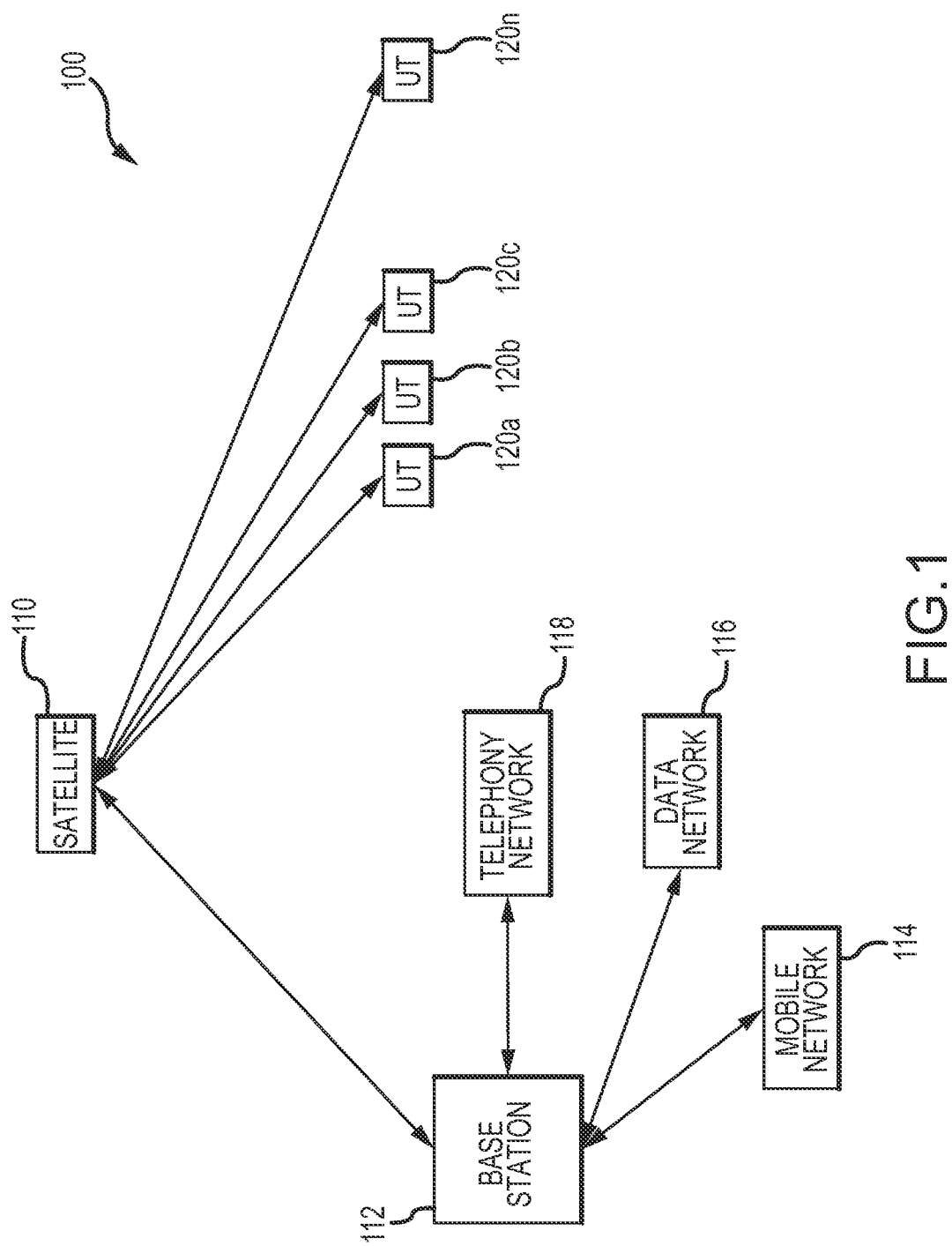
FIG. 1 is a diagram illustrating an arrangement for a conventional satellite communication system.

FIG. 1 illustrates an arrangement for a conventional satellite communication system 100. The satellite communication system 100 includes a satellite 110, a base station 112, and a plurality of user terminals 120 (i.e., 120a, 120b, 120c . . . 120n). The base station 112 integrates communication between different user terminals 120 by way of the satellite 110. The satellite communication system 100 is also capable of communicating with various terrestrial (or external) networks, such as a mobile (or wireless) network 114, a data network 116, and a telephony network 118.

The external networks 114, 116, 118 may be any suitable wireline and/or wireless network. For example, telephony network 118 can include a circuit-switched network, such as the public switched telephone network (PSTN), an integrated services digital network (ISDN), a private branch exchange (PBX), an automotive telematics network, or other like network. The wireless network 114 may employ various technologies including, for example, code division multiple access (CDMA), time division multiple access (TDMA), orthogonal frequency-division multiple access (OFDMA), which are embodied in standards such as worldwide interoperability for microwave access (WiMAX), high-speed packet access (HSPA), long term evolution (LTE), IS-95, wireless fidelity (WiFi), etc. The data network 116 may be any local area network (LAN), metropolitan area network (MAN), wide area network (WAN), the Internet, or any other suitable packet-switched network, such as a commercially owned, proprietary packet-switched network having voice over Internet protocol (VoIP) capabilities, e.g., a proprietary cable or fiber-optic network.

The user terminals 120 operate under a TDMA protocol in order to access shared inroute channels for transmissions through the satellite 110 and the base station 112. Several user terminals 120 can share a single inroute channel to communicate with base station 112, hence sharing the bandwidth. There could be several inroutes associated with one outroute. TDMA requires that each user terminal 120 transmits its data bursts to the satellite 110 for relay to the base station 112 such that the bursts start within a narrow window of time in a specified slot of a particular frame at the base station 112. The variations in the propagation delay between the user terminals 120 and the base station 112 require execution of procedures to determine exactly when the user terminal 120 should transmit a data burst, so that it will arrive at the base station 112 in the assigned frames at the assigned times.

Figure 2:
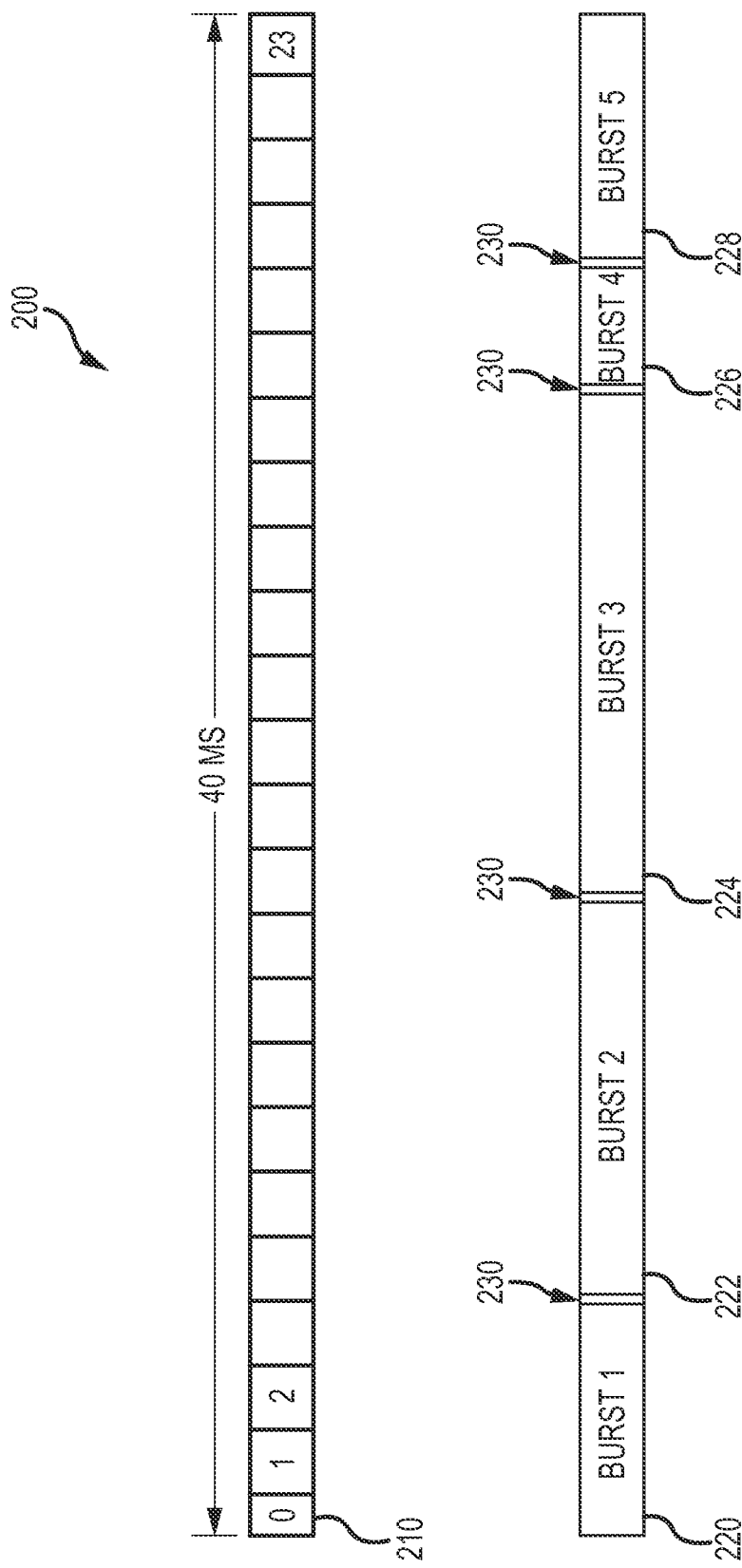
FIG. 2 is a diagram illustrating a configuration for a conventional TDMA frame.

FIG. 2 illustrates a configuration for a conventional TDMA frame 200 having a length of 40 ms. The TDMA frame 200 contains twenty four (24) equally spaced time slots 210. Each time slot 210 is therefore 1.667 ms in length. The time slots 210 can be assigned to different user terminals 120 for transmitting information. FIG. 2 also illustrates an arrangement of multiple bursts within the TDMA frame 200. The base station 112 can generate the bursts such that they occupy one or more time slots 210. For example, burst 220 contains four time slots, and has a length of 6.667 ms. Burst 220 can also be referred as a 4-slot burst. Burst 222 contains six slots and has a length of 10 ms. Thus, burst 222 is a 6-slot burst. Similarly, bursts 224, 226, and 228 have lengths of eight time slots, two time slots, and four time slots, respectively. A guard period 230 can be assigned between each burst and/or time slot in order to allow for slight mistimings between each burst and to avoid collision at the receiver. Accordingly, multiple user terminals 120 can communicate with the base station 112 via the satellite 110 using the same inroute frequency in a TDMA based system so that there are no collisions.

Although FIG. 2 illustrates five bursts being contained entirely within the TDMA frame 200, it is possible for bursts to extend across frame boundaries during normal operation. For example, it is possible for burst 228 to have eight time slots. Four time slots would be contained within the illustrated TDMA frame 200, and four additional time slots would cross the frame boundary such that they are contained within an adjacent TDMA frame (not shown). It is further possible for a burst from a preceding TDMA frame (not shown) to extend into the illustrated TDMA frame 200.

Figure 3A:
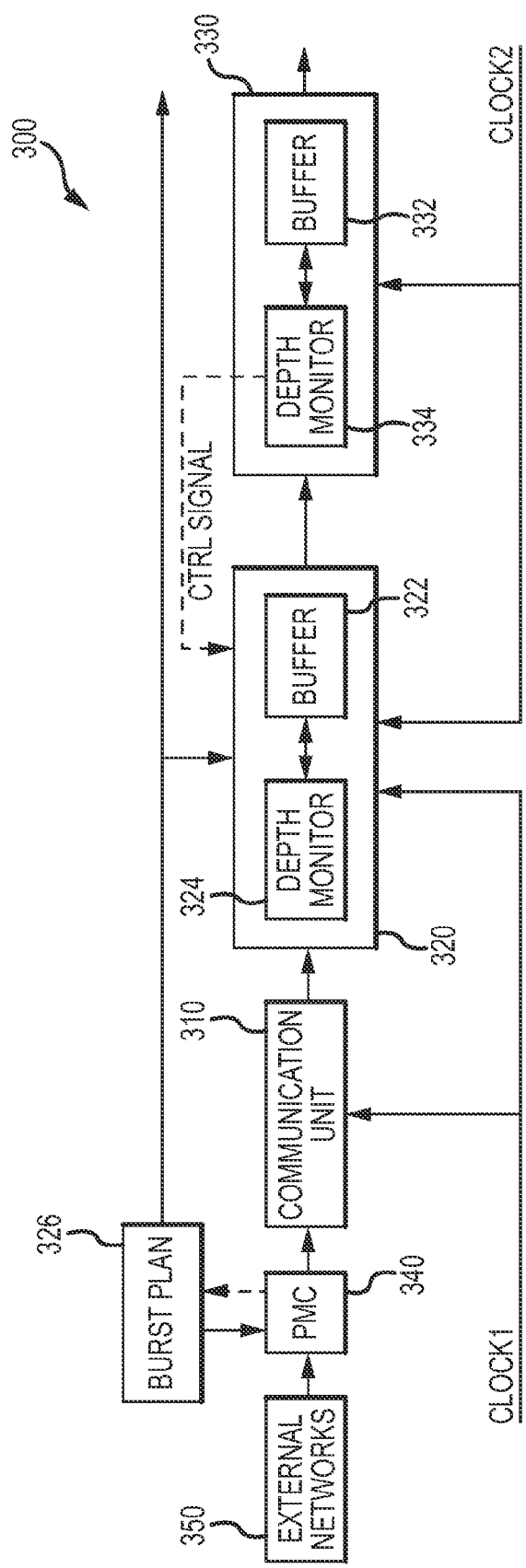
FIG. 3A is a block diagram illustrating components of an apparatus for synchronizing data transmission, in accordance with at least one embodiment.
Figure 3B:
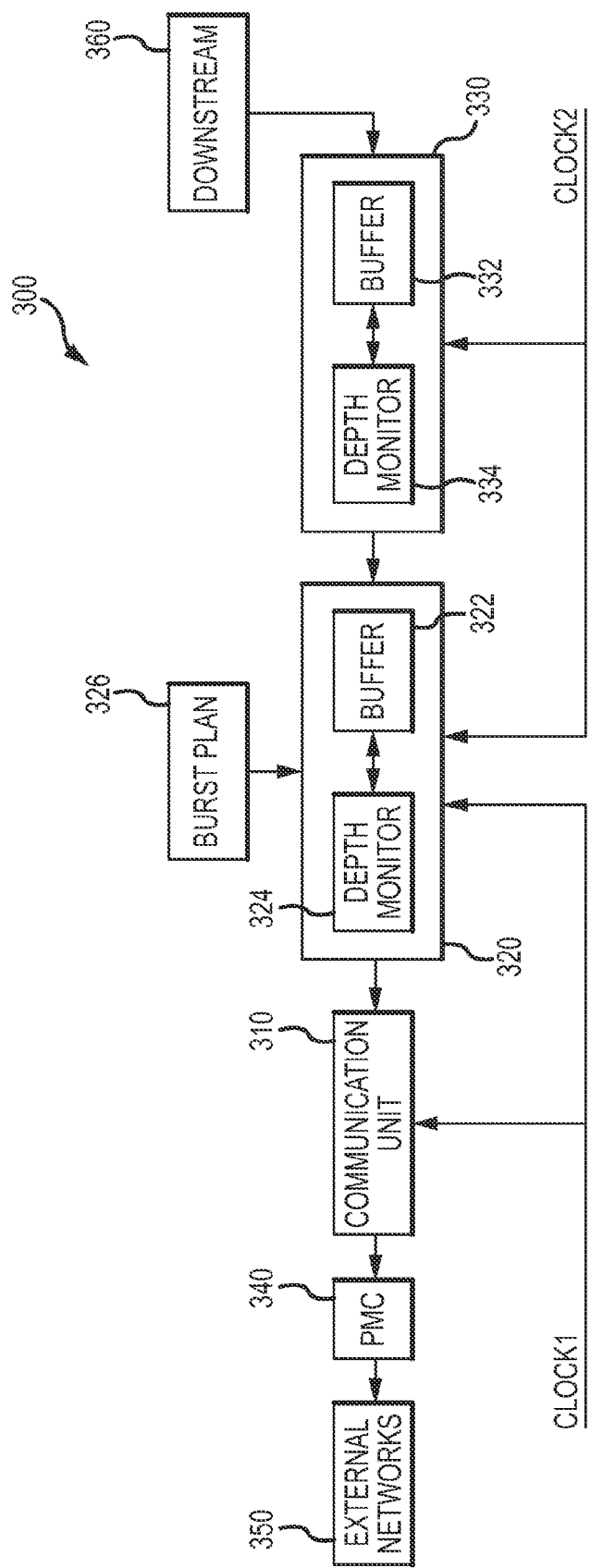
FIG. 3B is a block diagram illustrating components of an apparatus for synchronizing data transmission, in accordance with another embodiment.

FIGS. 3A and 3B are block diagrams illustrating components of an apparatus for synchronizing data transmission in accordance with at least one embodiment. Referring to FIG. 3A with specificity, the apparatus 300 includes a communication unit 310, a synchronization unit 320, and an interface unit 330. FIG. 3A further illustrates two different clocks being provided to the apparatus 300. Specifically, a first clock signal (clock1) is supplied to the communication unit 310 as well as the synchronization unit 320. Furthermore, a second clock signal (clock2) is supplied to the synchronization unit 320 as well as the interface unit 330.

According to an embodiment, the communication unit 310 receives upstream information from an external source. The upstream information can be in the form of voice, data, voice over IP, etc. The upstream information can also be a combination of different formats. Furthermore, the upstream information can be received from various sources including, but not limited to, traditional voice communication networks (e.g., PSTN, ISDN, PBX, etc.), cellular networks (e.g., IS-95, GSM, etc.), mobile data networks (3G, 4G, WIMAX, HSPA, etc.), the Internet, or any combination of the above. According to at least one embodiment, a packet modem controller 340 (PMC) is configured to interface with the various external networks 350 in order to receive the different formats of the upstream information. The PMC 340, therefore, is configured to receive information that is formatted in accordance with various different types of protocols. The PMC 340 performs various operations necessary to generate the upstream information such that it incorporates and integrates the various formats into a single stream of data.

The upstream information generated by the PMC 340 is then supplied to the communication unit 310. The communication unit 310 generates a first sample stream which represents the upstream information. As used herein, a sample stream corresponds to a discrete time sequence of samples which represent the signal being transmitted or received. According to at least one embodiment, the first sample stream is generated in accordance with a TDMA protocol. As previously discussed, TDMA protocols require data to be arranged in the form of multiple frames containing, for example, 24 time slots per frame. Each TDMA frame is 40 ms, thereby providing time slots that are 1.667 ms in length. Guard periods can optionally be incorporated between TDMA frames and/or individual timeslots.

According to the embodiment illustrated in FIG. 3A, the communication unit 310 utilizes the first clock signal when generating the first sample stream. More particularly, the communication unit 310 utilizes the first clock signal in order to establish the start of individual TDMA frames, as well is the individual slots within each frame of the sample stream. Thus, as the upstream information is supplied to the communication unit 310, the first sample stream is generated to represent the upstream information. The first sample stream is then supplied to the synchronization unit 320.

The synchronization unit 320 receives the first sample stream, and is able to synchronize transfer from the communication unit 310 in order to perform any necessary processing based on the first timing clock. According to an embodiment, the synchronization unit 320 receives the first clock signal from a common source which also supplies the first clock signal to the communication unit 310. According to another embodiment, the synchronization unit 320 deciphers the first timing clock using information embedded in the first sample stream itself. For example, each TDMA frame can include header containing synchronization information which allows the synchronization unit 320 to extract timing information necessary to properly receive the first sample stream.

According to an embodiment, the synchronization unit 320 performs a burst placement process in order to convert the first sample stream into a second sample stream. As illustrated in FIG. 3A, the synchronization unit 320 can also receive a second clock signal. The second clock signal is utilized in generating the second sample stream so that the second sample stream can be properly received and processed by, for example, a second communication system. For example, the second communication system can be a network independently operated by a different service provider at clock rate corresponding to the second clock signal. According to an embodiment, the second sample stream is also generated in accordance with TDMA protocols. Thus, the second sample stream is also in the form of a plurality of TDMA frames.

According to at least one embodiment, the synchronization unit 320 and the PMC 340 receive information corresponding to a predetermined burst plan 326. The burst plan 326 can be supplied by a control facility (not shown) which monitors and oversees operation of the apparatus 300 and/or the various communication networks. According to further embodiments, the PMC 340 can generate the burst plan 326. The burst plan 326 would then be supplied to the synchronization unit 320. Furthermore, the PMC 340 can optionally supply the burst plan 326 to any external systems, user terminals, etc. The burst plan 326 can contain, for example, information pertaining to the allocation of time slots for different control sites (or customers) whose communications are received and transmitted by the apparatus 300. According to at least one embodiment, the burst plan 326 can vary depending on different factors including, but not limited to, time of day, system load, subscriber service type, etc. For example, the burst plan 326 can provide an increased number of time slots to a particular site during times when subscribers are traveling to or from work. Similarly, the number of time slots can be decreased for the same site when subscribers are presumed to be inactive (e.g., sleeping). Furthermore, various system failures can require reallocation of timeslots in order to maintain continuous service and/or provide a required level of quality. The burst plan 326 can therefore be supplied to the synchronization unit 320 continuously or at predetermined intervals.

According to other embodiments, however, the burst plan 326 can be fixed. A fixed burst plan 326 can provide a predetermined allocation of timeslots to different sites without variations. According to such embodiments, the burst plan 326 can be supplied to the synchronization unit 320 once, or at predetermined extended intervals. For example, the burst plan 326 can be provided daily, every 12 hours, every 6 hours, etc. According to other embodiments, a fixed burst plan 326 may be stored in nonvolatile memory of the synchronization unit 320, thereby eliminating the need to transmit or update the allocation of timeslots.

The synchronization unit 320 generates the second sample stream in the form of sequential bursts that are arranged in accordance with the burst plan 326. For example, the 24 timeslots within a TDMA frame can be allocated as three sequential bursts each having a length of 8 timeslots. Alternatively, the TDMA frame can be arranged as a 4-slot burst, a 6-slot burst, an 8-slot burst, and a 6-slot burst. Another exemplary TDMA frame can be configured as a 6-slot burst, a 2-slot burst, a 2-slot burst, a 6-slot burst, a 2-slot burst, and a 6-slot burst. As can be appreciated, various combinations for the size of the individual bursts can be utilized within the time slots contained in each TDMA frame.

The second sample stream is subsequently output to the interface unit 330. The interface unit 330 receives the second sample stream, and performs any necessary processing. According to an embodiment, the interface unit 330 also receives the second clock signal in order to determine the necessary timing information for receiving the second sample stream. As previously discussed, at least one embodiment allows for extraction of timing information from the sample stream itself. For example, the timing information can be extracted from header information contained within the TDMA frames. Once the second sample stream has been received and processed by the interface unit 330, the second sample stream is output to an appropriate external system. According to at least one embodiment, the interface unit 330 outputs the second sample stream to a ground based beam former (GBBF) which is part of a satellite communication system.

As previously discussed, the apparatus 300 illustrated in FIG. 3A is capable of synchronizing the transfer of information between systems operating at different clock rates, i.e., clock1 and clock2. Depending on the speed and relative difference between the 2 different clock rates, the first sample stream and the second sample stream may be timed with clocks that are faster or slower than one another. According to at least one embodiment, the apparatus 300 compensates for the difference in clock speeds by incorporating a buffer 322 within the synchronization unit 320. The buffer 322 is used as an intermediate storage for the second sample stream. Thus, transfer of the second sample stream to the interface unit 330 is performed via the buffer 322.

As can be appreciated, if the first clock rate and the second clock rate are equal, the buffer 322 would remain at a relatively constant size. If the second clock rate is faster than the first clock rate, then the second sample stream would be retrieved from the buffer 322 at a quicker rate than the first sample stream is being converted. Consequently, the relative size of the buffer 322 would decrease. If the first clock rate is faster than the second clock rate, however, then the first sample stream would be converted and stored in the buffer 322 faster than it can be retrieved by the interface unit 330. Consequently, the relative size of the buffer 322 would increase. Although a depth monitor is illustrated for monitoring the buffer, other embodiments provide for different configurations to detect and/or monitor the relative size of the buffer. For example, one or more counters (i.e., counting circuitry) can be provided to measure timing of the different sample clocks and output an appropriate control signal for synchronizing the first and second sample streams. Additionally, the first clock signal and the second clock signal can be passed through an XOR gate and filtered in order to detect the relative difference between the two clock signals. The result can be used to generate an appropriate control signal for synchronizing the first and second sample streams.

According to at least one embodiment, the synchronization unit 320 includes a depth monitor 324 which continuously monitors the size of the buffer 322. If the depth monitor 324 determines that the buffer 322 has exceeded a predetermined maximum threshold (i.e., Tmax), a control signal is generated in order to alert the synchronization unit 320 of the buffer status. The synchronization unit 320 can adjust the rate at which the first sample stream is being converted so that the size of the buffer 322 can be reduced. More particularly, the synchronization unit 320 can be configured to reduce the conversion rate of the first sample stream, as discussed in greater detail below herein below with respect to FIG. 4. Similarly, if the size of the buffer 322 falls below a predetermined minimum threshold (i.e., Tmin), then the depth monitor 324 would generate the control signal so that the synchronization unit 320 increases the rate at which the first sample stream is being converted.

The predetermined thresholds for the buffer 322 can be selected in various ways. According to at least one embodiment, the size of the buffer 322 can be selected based on desired system performance. For example, the maximum and minimum thresholds can be set for ±10% variation from the average acceptable size (e.g., 40%-60%) of the buffer capacity. Accordingly, the maximum threshold would correspond to about 70% buffer capacity, whereas the minimum threshold would correspond to about 30% buffer capacity. According to other embodiments the maximum and minimum thresholds may be set at ±10% of the buffer's midpoint, thus resulting in maximum and minimum thresholds of 60% and 40%, respectively.

As can be appreciated, the overall capacity of the buffer 322 can be selected based on desired system performance, tolerance, and/or quality of service (QoS). For example, an excessively large buffer may result in increased delays and lag on system performance. An excessively small buffer, however, may be insufficient to accommodate system variations, thereby resulting in lost user data. While the physical size of the buffer 322 may vary in accordance with desired performance, the maximum and minimum thresholds can still be selected based on, for example, system requirements, quality of service, latency, jitter, service type, etc. As can be appreciated, a larger buffer size will be capable of accommodating more lag in the synchronization (i.e., the time it takes to "add" or "drop" a sample once the threshold is crossed), so as not to overflow or underflow buffer. The larger buffer size can introduce some latency through system, depending on factors such as service type (i.e., voice, data, etc.). According to embodiments which require minimum latency, the range between maximum and minimum thresholds can be selected to be as small as possible to minimize the delay variation through the system and to allow for smaller buffer size. Furthermore, the minimum range can be selected as a function of the sample period (i.e. should be at least 1 sample period). In other embodiments, the physical size of the buffer 322 can be selected based on the maximum number of dropped samples allowable.

Accordingly, the actual buffer size and thresholds can be selected based on the specific system implementation and desired results.

According to an embodiment, a buffer 332 can be provided within the interface unit 330 instead of, or in conjunction with, the buffer 322 in the synchronization unit 320. Buffer 332 can be configured, for example, for storing the second sample stream prior to being output to the external system. Thus, depending upon the rate at which the external system is able to retrieve and process the second sample stream, the rate of conversion applied by the synchronization unit 320 can be adjusted to prevent overflow or underflow situations that may result in a loss of user data.

According to at least one embodiment, a depth monitor 334 can also be provided in the interface unit 330 in order to monitor the relative size of the buffer 332, in a manner similar to that previously discussed. Accordingly, if the size of the buffer 332 exceeds a predetermined maximum threshold, then the depth monitor 334 would issue a control signal to the synchronization unit 320 in order to reduce the rate at which the second sample stream is being converted. If the size of the buffer 332 falls below a predetermined minimum threshold, then the depth monitor 334 would issue the control signal to the cause the synchronization unit 320 to increase the rate at which the first sample stream is being converted.

FIG. 3B illustrates the apparatus 300 during synchronization of data on a reverse path from an external system. More particularly, as previously discussed, one embodiment provides for communication with the external system in the form of a GBBF. Thus, FIG. 3B illustrates the situation where downstream information 360 is received from the GBBF, and supplied to external networks 350 such as, for example, the previously described telephone network, cellular network, data network, etc. According to an embodiment, the downstream information 360 is received by the interface unit 330. In particular, the downstream information 360 can be temporarily stored in the buffer 332 while any necessary processing is performed by the interface unit 330. For example, it may be necessary to downconvert the frequency of the signal carrying the downstream information 360 prior to generating the second sample stream.

According to various embodiments, the GBBF can be configured to operate TDMA protocols. The GBBF would therefore transmit the downstream information 360 in the form a stream of samples containing TDMA frames. According to an embodiment, the interface unit 330 and the GBBF can be configured to operate at the second clock rate (i.e., clock2). The second clock rate can be supplied, for example, directly to the interface unit 330 as illustrated in FIG. 3B. According to other embodiments, the interface unit 330 can be configured to extract the necessary clock information directly from the downstream information 360 received from the GBBF.

The interface unit 330 performs any necessary processing to the downstream information 360, and generates the second sample stream. According to an embodiment, the downstream information 360 can be configured as the second sample stream, thereby eliminating the need to perform any further processing related to generating the second sample stream. The interface unit 330 then supplies the second sample to the synchronization unit 320 for conversion into the first sample stream.

As illustrated in FIG. 3B, the synchronization unit 320 can be configured to receive both the first clock rate and the second clock rate. According to an embodiment, the synchronization unit 320 performs burst extraction to convert the second sample stream (at the second clock rate) into the first sample stream (at the first clock rate). For example, the synchronization unit 320 can include a buffer 322 which is configured to directly receive the second data stream. The size of the buffer can increase or decrease due to the difference between the first clock rate and the second clock rate. According to an embodiment, a depth monitor 324 can be provided to continually monitor the relative size of the buffer.

If a predetermined maximum threshold Tmax is reached, the depth monitor 324 can be configured to send a control signal indicating that the rate of conversion should be increased. The depth monitor 324 can also be configured to send the control signal indicating that the rate of conversion should be decreased if a predetermined minimum threshold Tmin is reached. According to other embodiments, the interface unit 330 can be configured to include a buffer 332 and a depth monitor 334. According to such embodiments, the depth monitor 334 continually monitors the size of the buffer 332, but supplies the control signal to the synchronization unit 320 to perform burst extraction from the second sample stream.

During the conversion process, various embodiments provide for supplying a burst plan 326 to the synchronization unit 320. Information contained in the burst plan 326 can be used to determine the length and arrangement of bursts within the second sample stream in order to properly generate the first sample stream. The synchronization unit 320 then provides the first sample stream to the communication unit 310. The communication unit 310 then processes the first sample stream into the appropriate format for output to the external networks 350. As previously discussed, the PMC 340 can perform the necessary processing and conversion for communicating with the external networks 350.

Figure 4C:
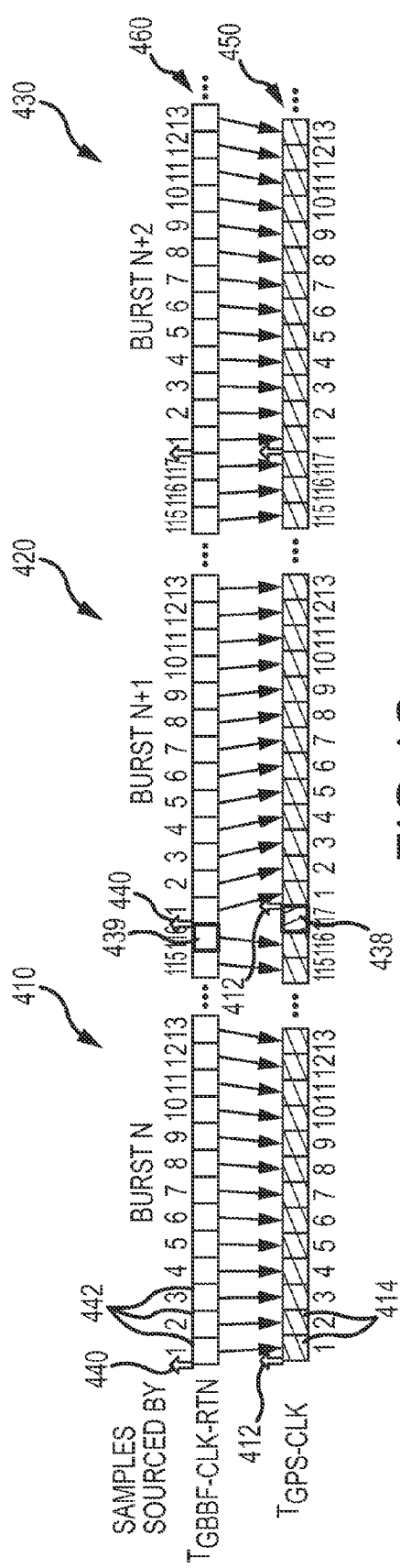
FIG. 4C is a diagram illustrating the details of converting a second sample stream to a first sample stream, in accordance with one or more embodiments.

FIG. 4A is a diagram illustrating the details of converting a first sample stream received by the communication unit 310 to a second sample stream for output by the interface unit 330, in accordance with at least one embodiment. FIG. 4A further illustrates a situation where the first clock rate is faster than the second clock rate. Three exemplary bursts are illustrated, namely burst N 410, burst N+1 420, and burst N+2 430. For purposes of illustration, various constraints have been applied to the information illustrated in FIGS. 4A-4D. This is only done for purposes of quantitatively examining and explaining various aspects of the embodiment. It should be noted, however, that such constraints are not intended to be limiting in anyway.

According to an exemplary embodiment, the information received by the communication unit 310 can be sampled at a rate of 23,400 samples per second (23.4 Ksamp/sec). This results in a total of 23,400 samples being generated each second. Using a TDMA frame length of 40 ms with 24 slots per frame, the number of samples present in each TDMA slot can be calculated as 23,400×0.04÷24=39. Thus, according to the exemplary embodiment, each TDMA slot contains 39 samples (e.g., reference numerals 414 and 442). Furthermore, bursts N, N+1, and N+2 (410, 420, 430) are each selected to be a 3-slot burst according to the predetermined burst plan 326. Accordingly, bursts N, N+1, and N+2 (410, 420, 430) each contain a total of 117 samples.

According to FIG. 4A, the first clock is operating at a faster rate than the second clock. At the beginning of the cycle, the start-of-burst marker 412 of the first sample stream 450 occurs at the same time as the start-of-burst marker 440 of the second sample stream 460. Since the first clock is faster than the second clock, the samples 414 in the first sample stream 450 arrive at a faster rate. As illustrated in FIG. 4A, sample 444 in burst N 410 for the second sample stream 460 ends just before the start-of-burst marker 412 of burst N+1 420 of the first sample stream 450. If the last sample 416 of the first sample stream 450 were converted, the corresponding sample (not shown) in the second sample stream 460 would end well beyond the start of burst marker 412 for burst N+1 420 of the first sample stream 450.

According to an embodiment, the synchronization unit 320 accounts for this difference by dropping the last sample 416 from the first sample stream 450. Accordingly, burst N 410 of the second sample stream 460 only contains 116 samples from the first sample stream 450 after conversion. Additionally, the last sample 416 of the first sample stream 450 is dropped during the guard period which occurs between burst N 410 and burst N+1 420. According to an embodiment, a predetermined number of samples at the end of each burst can contain padding data. For example, such samples can contain a stream of 0s. According to another embodiment, such samples can include information that is repeated in each burst that is transmitted. Alternatively, the information can be repeated predetermined bursts. Accordingly, by dropping the final sample 416 of burst N 410, no actual user data is ever lost. Furthermore, if the information contained in the last sample 416 is repeated in each burst, or predetermined bursts, it can be reconstructed from subsequent bursts despite the loss of a single sample.

According to a still further embodiment, the samples can be dropped from the beginning of the burst. More particularly, rather than dropping the last sample (or samples), the first sample (or samples) can be dropped during the guard period immediately preceding the burst. For example, instead of dropping the last sample 416 in burst N 410, the first sample 418 in burst N+1 420 would be dropped. However, the same guard period would be used to drop samples (416 and 418) under both conditions. Thus, either the last sample 416 (or samples) of burst N 410, or the first sample 418 (or samples) of burst N+1 420 would be dropped during the guard period between burst N 410 and burst N+1 420. Further various embodiments allow for simultaneously dropping the last sample 416 (or samples) of burst N 410 as well as the first sample 418 (or samples) of burst N+1 420 during the guard period between these two bursts.

As further illustrated in FIG. 4A, the start-of-burst markers 440 for burst N+1 420 are only slightly out of alignment between the first sample stream 450 and the second sample stream 460. According to at least one embodiment, the last sample of any given burst is only dropped if a predetermined amount of delay is present. For example, the predetermined delay can be determined based on when the start-of-burst marker 440 for burst N 410 of the second sample stream 460 occurs within one half (½) sample length of burst N 410 of the first sample stream 450. According to other embodiments, the amount of delay can be greater than one sample (e.g. 2 samples, 3 samples, etc.) or it can be less than one half sample (e.g. one third sample, one quarter sample, etc.). The precise time required for determining whether a sample should be dropped is therefore based on desired system performance and configuration. The foregoing values, therefore, should only be considered as exemplary and in no way limiting. Furthermore, although FIG. 4A illustrates a single sample being dropped, as previously discussed, it is possible to configure the apparatus such that more than one sample is dropped.

As further illustrated in FIG. 4A, burst N+1 420 of the second sample stream 460 has a start-of-burst marker 440 which occurs slightly before the start-of-burst marker 412 for burst N+1 420 of the first sample stream 450. As the synchronization unit 320 continues to convert the first sample stream 450, all 117 samples 414 are converted to burst N+1 420 of the second sample stream 460 without the need to drop any samples. As the conversion process continues, the faster clock rate of the first sample stream 450 will again cause the start-of-burst markers 412 for the first sample stream 450 to exceed the alignment with the start-of-burst markers 440 for second sample stream 460. This would again result in the need to drop another sample, or samples, in order to maintain the necessary timing synchronization during the conversion process.

As previously discussed, the apparatus is configured such that dropping an individual sample, or samples, depending on system configurations, does not result in any loss of user data. Various embodiments, however, can allow for a predetermined amount of data loss while maintaining system tolerance. For example, such embodiments can be used to provide improvements in system performance by reducing retransmission of data, or to accommodate the use of a smaller buffer to reduce latency. According to still further embodiments, samples can be added or dropped in order to reduce, at least partially, the range over which the timing varies between the two different clock rates in order to accommodate the use of a reduced guard period. Such embodiments can allow the sample stream to be converted within a predetermined system tolerance or without any loss of user data.

As previously discussed, the synchronization unit 320 is capable of completely converting the first sample stream 450 to the second sample stream 460 without any loss of user data despite the difference in clock rates. Furthermore, it is noted that the two clock rates result in a timing difference which would otherwise be unbounded, and simply could not be absorbed within the conventional guard period that is inherently designed into, for example, the TDMA protocol. Thus, according to an embodiment, when the synchronization unit 320 receives a control signal from the depth monitor 324 to reduce the rate of conversion, the synchronization unit 320 would cause the last sample 416 of the next burst (i.e., burst N) being converted to be dropped from the first sample stream 450 without any loss of user data between the two different communication systems.

FIG. 4B illustrates the details of converting a first sample stream to a second sample stream where the first clock is slower than the second clock, according to at least one embodiment. At the start of the conversion process, the timing of start-of-burst marker 412 for burst N 410 for the first sample stream 450 is aligned with the start-of-burst marker 440 for the second sample stream 460. As burst N 410 is being converted, sample 419, in burst N 410 for the second sample stream 460 ends well before the corresponding start-of-burst marker 412 of burst N+1 420 of the first sample stream 450. According to an embodiment, the synchronization unit 320 is configured to add sample 446 to burst N 410 of the second sample stream 460. Accordingly, burst N 410 of the second sample stream 460 now contains 118 samples.

The added sample 446 can be constructed in various ways in order to maintain data accuracy. According to at least one embodiment, the added sample 446 can be populated with zeros, and inserted into the second sample stream 460 during the guard period between burst N 410 and burst N+1 420 of the first sample stream 450. As previously discussed, various embodiments can allow for the precise timing for adding a sample to vary. Furthermore, depending on specific system design and performance requirements, more than one sample may be added. As further illustrated in FIG. 4B, all of the samples 414 contained in burst N+1 420 of the first sample stream 450 are converted into burst N+1 420 of the second sample stream 460 without the need to add an extra sample, despite the difference in clock speeds. As the conversion process continues, however, the difference in clock speeds may again require the need to add an additional sample into a subsequent burst of the second sample stream 460 during the conversion process.

According to various embodiments, the difference in speed between the first and second clock can vary. For example, the first clock speed may be fixed, while the second clock fluctuates between a speed that is faster than the first clock to a speed that is slower than the first clock. Such variations can be cyclical, temporary, random, etc. According to such an embodiment, the synchronization unit 320 can be configured to convert the first sample stream 450 into the second sample stream 460 by dropping samples at the appropriate time when the second clock speed is slower than the first clock speed. This situation is illustrated in FIG. 4A. As the second clock speed fluctuates, however, and becomes faster than the first clock speed, the synchronization unit 320 would add a sample to the appropriate burst within the second sample stream 460. This situation is illustrated in FIG. 4B.

Figure 4D:
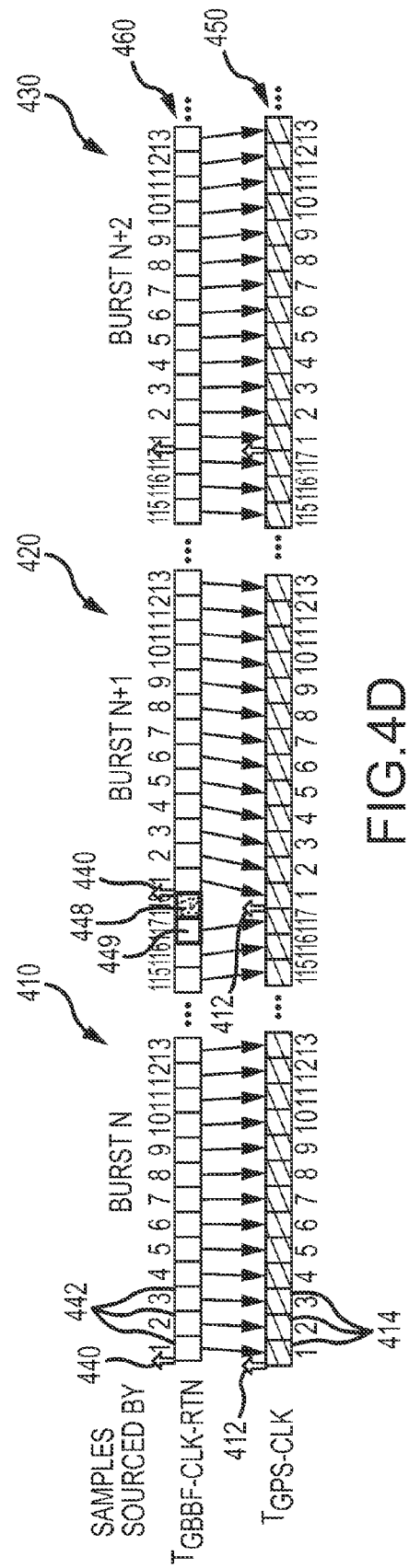
FIG. 4D is a diagram illustrating the details of converting a second sample stream to a first second sample stream, in accordance with one or more embodiments.

FIGS. 4C and 4D illustrate conversion of a sample stream received by the interface unit 330 to another sample stream for output by the communication unit 310. For purposes of consistency with the example illustrated in FIGS. 4A and 4B, the same reference numerals have been applied to identify various elements that are common in these Figures. For example, the first sample stream is identified by reference numeral 450 and the second sample stream is identified by reference numeral 460. It should be noted, however, that within this direction of data flow, the second sample stream 460 is actually first received by the interface unit 330 and supplied to the synchronization unit 320. The synchronization unit 320 then converts this received sample stream into the first sample stream 450 for subsequent output to the various networks.

FIG. 4C illustrates the condition where the clock rate of the second sample stream 460 is slower than the clock rate of the first sample stream 450. At the start of the conversion process, the start-of-burst marker 440 of burst N 410 in the second sample stream 460 is aligned with the start-of-burst marker 412 of burst N 410 in the first sample stream 450. As the samples 442 from burst N 410 of the second sample stream 460 are transmitted, sample 439 in burst N 410 for the second sample stream 460 ends just before the start-of-burst marker 412 of burst N+1 420 of the first sample stream 450. If an additional sample (not shown) were converted, the corresponding sample in burst N 410 of the first sample stream 450 would end well beyond this start of burst marker 412. Accordingly, the synchronization unit 320 is configured to generate a sample 438 that is populated with zero values. This sample 438 is then added to burst N 410 of the first sample stream 450 as the final sample within burst N 410. As previously discussed, sample 438 is added during the guard period between sample N and sample N+1.

As the synchronization unit 320 continues to convert the second sample stream 460, all 117 samples 442 contained in burst N+1 420 of the second sample stream 460 are converted to burst N+1 420 of the first sample stream 450 without the need to add any additional samples. As the subsequent bursts 442 are received and converted, however, it will again become necessary for the synchronization unit 320 to add a sample 438 to a selected burst due to the timing differences. As previously discussed, the synchronization unit 320 can receive a control signal from the depth monitor 324 in order to indicate that a sample should be added at the end of the next burst in the first sample stream 450. Furthermore, the sample is added during the next guard period which occurs between bursts of the second sample stream. According to other embodiments, the sample (or samples) can be, for example, added at the beginning of burst N+1 420 during the guard period during burst N 410 and burst N+1 420. According to still further embodiments, samples can be added both at the end of burst N 410 and the beginning of burst N+1 420.

FIG. 4D illustrates the situation where the second clock rate is faster than the first clock rate. At the beginning of the conversion process, the start-of-burst marker 440 for the second sample stream 460 is in alignment with the start-of-burst marker 412 for the first sample stream 450. Depending on the difference between the first clock rate and the second clock rate, the first few samples within burst N 410 may be almost precisely aligned between the second sample stream 460 and the first sample stream 450. Since the second clock rate is faster than the first clock rate, the start-of-burst marker 412 of burst N+1 420 in the first sample stream 450 occurs well beyond the end of sample 449 of burst N 410 of the second sample stream 460. Accordingly, the last sample 448 of burst N 410 in the second sample stream 460 is dropped during the guard period between burst N 410 and burst N+1 420. When burst N+1 420 is converted, however, all of the samples from the second sample stream 460 are converted to the first sample stream 450 despite the difference in clock rate. Due to the difference in clock speeds, however, it will again become necessary to drop a sample from an appropriate burst in the second sample stream 460 in order to maintain proper synchronization. As previously discussed, a control signal can be supplied from the depth monitor 324 to indicate a timing for dropping the sample from a selected burst. Additionally, if the second clock varies with respect to the first clock, it may be necessary for the synchronization unit 320 to add and drop samples in the manner previously described in order to maintain proper synchronization.

Figure 5:
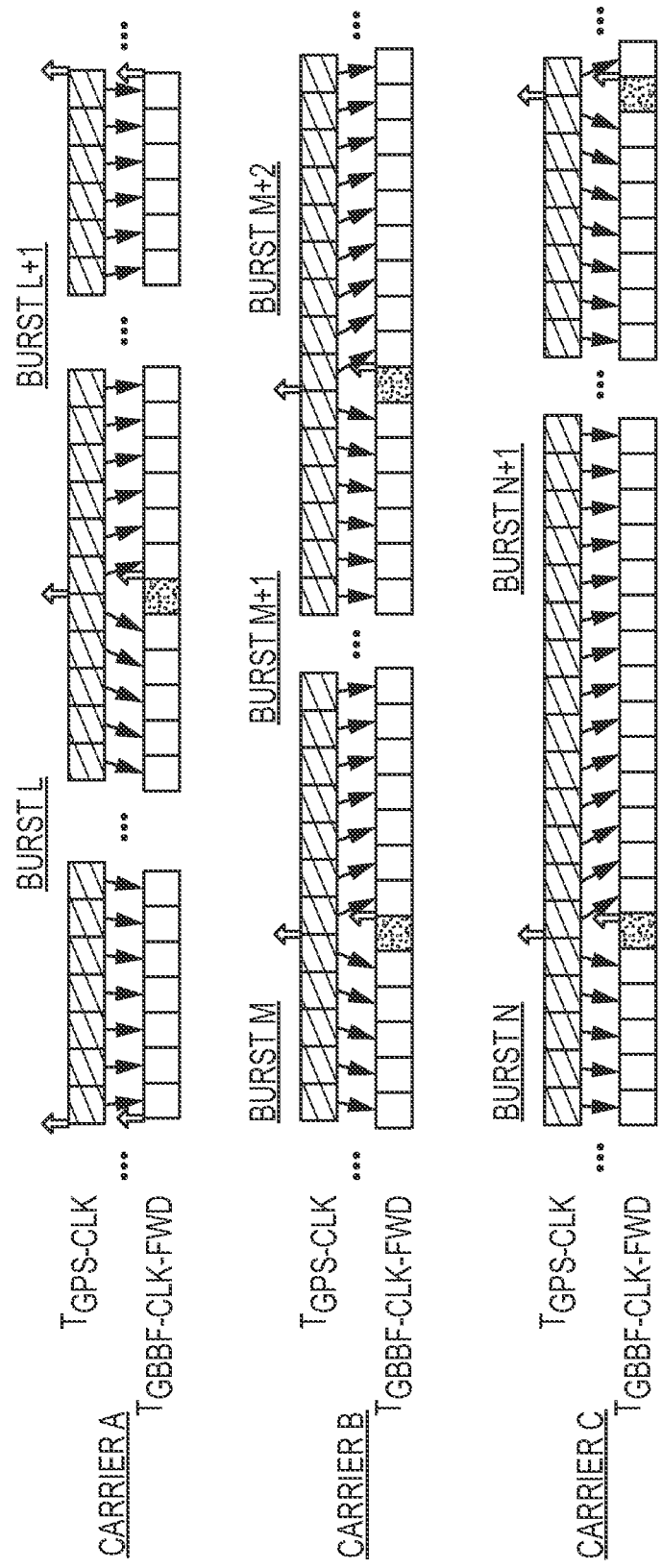
FIG. 5 is a diagram illustrating conversion of a first sample stream to a second sample stream across multiple carriers, in accordance with an embodiment.

FIG. 5 illustrates conversion of a first sample stream to a second sample stream according to another embodiment. The exemplary time period shows three different carriers, namely Carrier A, Carrier B, and Carrier C. FIG. 5 shows two bursts for Carrier A (L and L+1), three bursts for Carrier B (M, M+1, M+2), and two bursts for carrier C (N and N+1). Such a situation can occur, for example, because the start time of individual bursts may not be aligned across the different carriers. For example, Carrier A may contain a stream of 6-slot bursts, while Carrier B may contain a combination of 4-slot and 6-slot bursts. Carrier C may further contain a combination of 4-slot, 6-slot, and 9-slot bursts. The carriers can also have different MAC FWD TS offsets. Thus, burst start times can vary across the three carriers within the same time frame. One or more embodiments further provide for the carriers to be multiplexed and carried on the same beamport. The multiplexing can be performed using various techniques including, for example, frequency division, code division, etc.

According to an embodiment, the sample streams for each carrier are independently synchronized. For example, the synchronization circuit can be configured to add or drop samples based only on the guard times of samples L and L+1 for Carrier A. The samples can further be added or dropped at the end of burst L, the beginning of burst L+1, or both. The synchronization circuit would then add or drop samples for Carrier B based only on the guard times between bursts M and M+1 and/or between M+1 and M+2. The synchronization circuit would further add or drop samples for Carrier C based only on the guard times between burst N 410 and N+1.

Figure 6A:
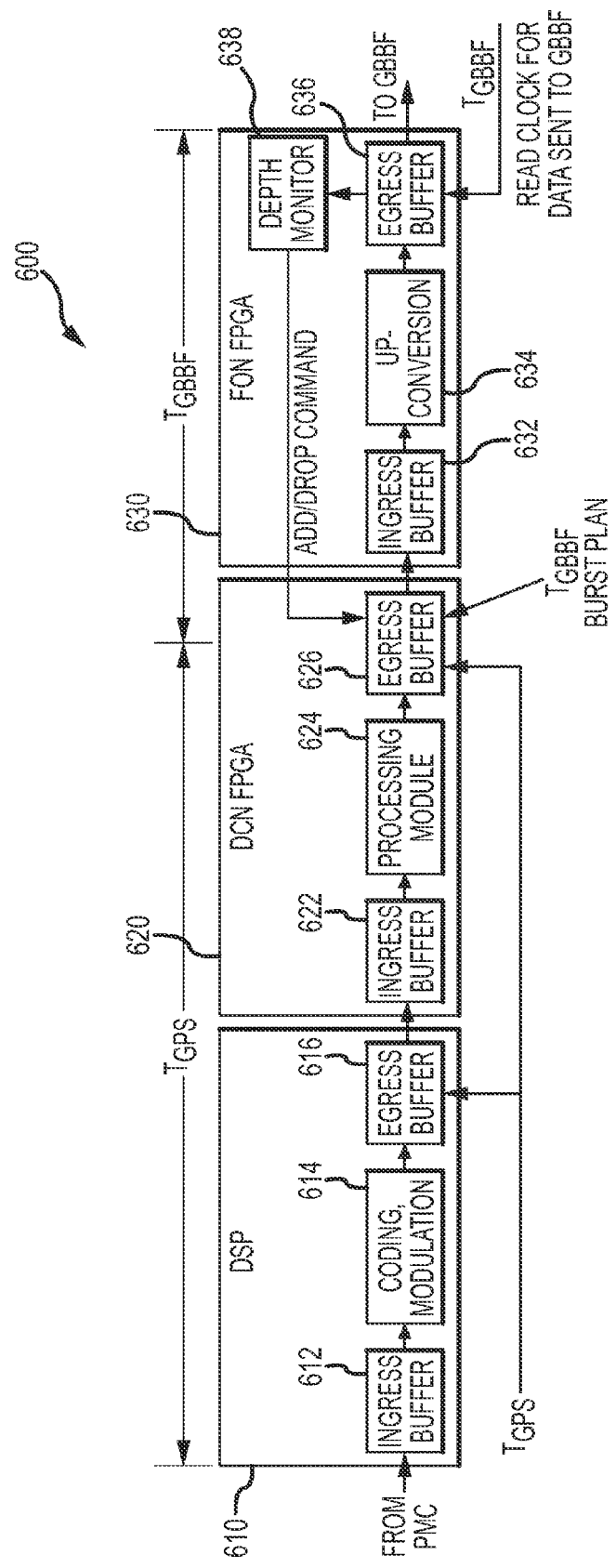
FIG. 6A is a block diagram illustrating an apparatus for synchronizing data transmission, according to one embodiment.
Figure 6B:
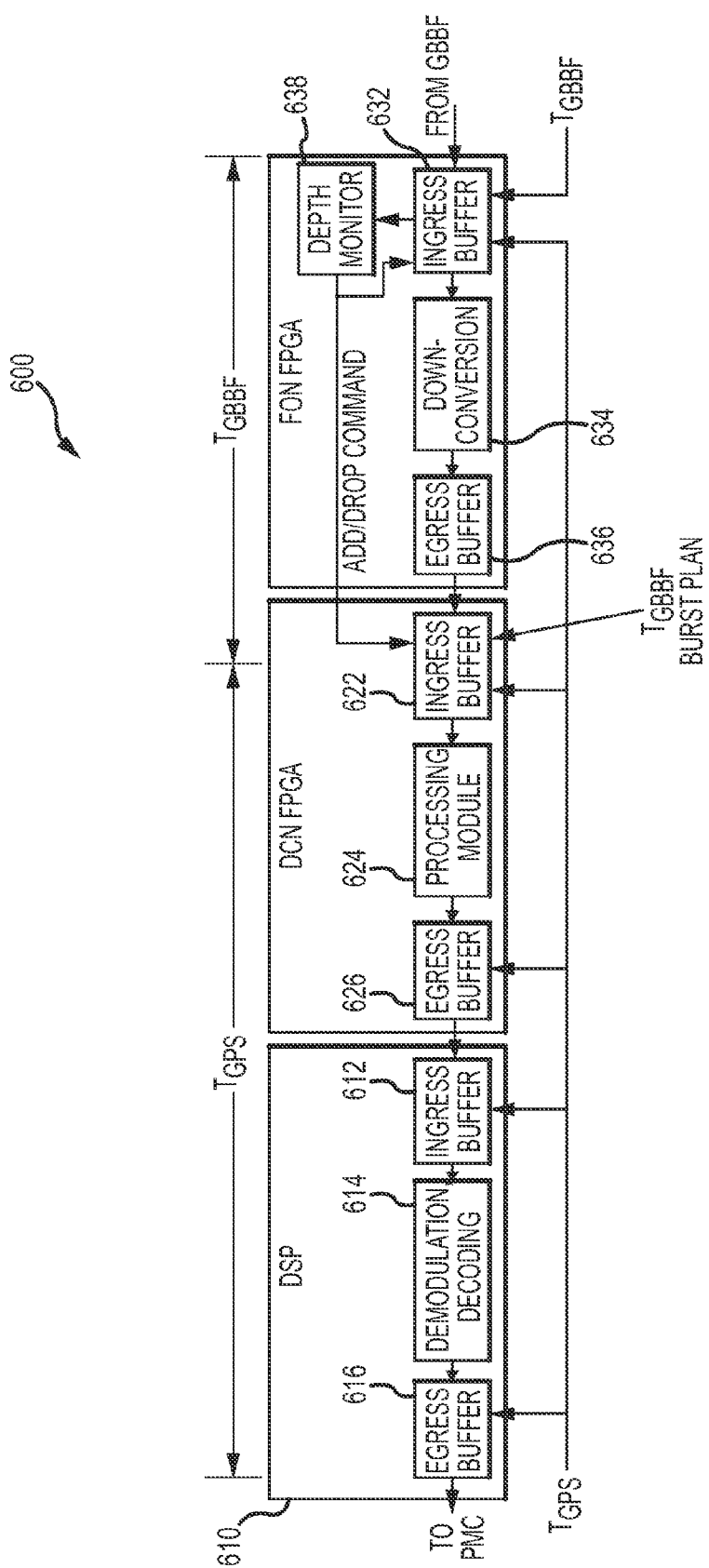
FIG. 6B is a block diagram illustrating an apparatus for synchronizing data transmission, according to another embodiment.

FIGS. 6A and 6B are block diagrams illustrating an apparatus 600 for synchronizing transmission in accordance with at least one embodiment. FIG. 6A illustrates a transmit flow path, whereas FIG. 6B illustrates a receive flow path. The apparatus 600 includes a digital signal processor (DSP) 610, a digital conversion unit (DCN) 620, and a fiber optic node (FON) 630. According to the illustrated embodiment, the apparatus 600 is capable of receiving communication from various external networks, performing various processing, and forwarding the information to a GBBF which forms part of a satellite communication system (not shown). According to other embodiments, the apparatus 600 can be configured to communicate with networks operated by different service providers utilizing different clock rates. The apparatus 600 is therefore capable of synchronizing communications between various different systems operating at different clock rates.

According to the illustrated embodiment, the information received by the DSP 610 can be in the form of voice, data, etc. According to at least one embodiment, the DSP 610 can include an ingress buffer 612, a coding/modulation unit 614, and an egress buffer 616. Information from the external network is received within the DSP ingress buffer 612 through an appropriate connection and/or interface. The DSP ingress buffer 612 can serve, for example, as a temporary storage unit for incoming data prior to processing by the coding/modulation unit 614. According to an embodiment, the interface between the DSP ingress buffer 612 and the external networks can be managed independently of the coding/modulation unit 620. Accordingly, transfer of data across the communication channel can vary depending on the load of the control unit (e.g., CPU, RISC processor, etc.) used in the DSP 610. For example, during heavy transactions, the control unit may allocate less processing timeslots for data transfer, thereby resulting in a reduced flow rate of information between the external networks and the DSP ingress buffer 612. If the load is reduced, however, the control unit may allocate more processing timeslots to data transfer, thereby increasing the rate at which data is supplied to the DSP ingress buffer 612. Accordingly, the DSP ingress buffer 612 can be sized to accommodate fluctuations in the rate of data transfer from the external networks.

The coding/modulation unit 614 retrieves the data from the DSP ingress buffer 612 and performs various processing to generate, for example, fixed sample length bursts that represent the information contained in the data supplied from the external networks. As illustrated in FIG. 6A, the DSP 610 receives timing information, such as GPS clock information ($T_{GPS}$) from an external source. This timing information is used, for example, to control placement of the bursts generated by the coding/modulation unit 612 with a predetermined timing. According to an embodiment, the bursts generated by the coding/modulation unit 614 are sequentially arranged in accordance with a TDMA protocol having its timing based on the GPS clock. The resulting sample stream (i.e., the first sample stream) is then stored within the egress buffer 616 until transmitted to the DCN 620.

According to an embodiment, the DCN 620 can include and ingress buffer 622, a processing module 624, and an egress buffer 626. Furthermore, the DCN 620 also receives the GPS clock signal. Accordingly, the DCN 620 is capable of synchronizing and operating at the same clock speed as the DSP 610. The DCN ingress buffer 622 receives the first sample stream from the DSP egress buffer 616 using TDMA timing based on the GPS clock signal. The processing unit 624 performs various operations on the sample stream in order to assist in preparations for transmission to the communication satellite. According to an embodiment, such processing can include upsampling, upconversion, channelization, etc. Once this processing is complete, the first sample stream is provided to the DCN egress buffer 626 at the GPS clock rate.

According to at least one embodiment, the DCN egress buffer 626 receives a second clock signal ($T_{GBBF}$) that is different from the GPS clock. For example, the second clock signal can be received from the GBBF and include a timing offset that results from the communication satellite's orbital drift. As previously discussed, this variation can cause the GBBF clock to vary through periods of being faster than the GPS clock, and slower than the GPS clock. According to the illustrated embodiment, the DCN egress buffer 626 converts the first sample stream to a second sample stream that is timed (or based) on the GBBF clock. Furthermore, various embodiments allow for supplying a burst plan to the DCN egress buffer 626. The burst plan can therefore be used to determine the arrangement and/or size of bursts generated by the DCN egress buffer 626 during the conversion process.

As illustrated in FIG. 6A, the FON 630 can include and ingress buffer 632, an upconversion unit 634, an egress buffer 636, and a depth monitor 638. The FON ingress buffer 632 receives the second sample stream at the GBBF clock rate, and supplies it to the upconversion unit 634 for further processing. The second sample stream is then provided to the GBBF via the FON egress buffer 636. According to the illustrated embodiment, the depth monitor 638 constantly monitors the size of the FON egress buffer 636. If the size of FON egress buffer 636 exceeds a predetermined maximum threshold (e.g., Tmax), then the depth monitor 638 issues a control signal to the DCN egress buffer 624 indicating that one or more samples should be dropped during the conversion process.

As previously discussed, the samples are dropped during guard periods between individual bursts forming the first sample stream. The samples are also dropped at predetermined times such as, for example, the guard period immediately following the current burst. Conversely, if the depth monitor 638 detects that the size of the FON egress buffer 636 falls below a predetermined minimum threshold (Tmin), the control signal is sent to the DCN egress buffer 626 indicating that at least one sample should be added to the second sample stream. As previously discussed, the sample would be added during the guard period between bursts within the first sample stream. The apparatus continues to receive information from the various networks, generates the first sample stream from the received information at the GPS clock rate, and converts the first sample stream to a second sample stream at the GBBF clock rate. The second sample stream can then be output to the GBBF for transmission to the communication satellite.

FIG. 6B illustrates the return path of the data from the satellite in accordance with an embodiment. On the return path, data received from the satellite via the GBBF is provided to the FON ingress buffer 632. According to an embodiment, the data is supplied to the FON ingress buffer 632 in the form of a second sample stream at the GBBF clock rate. The FON ingress buffer 632 supplies the second sample stream to the processing unit 634 for appropriate processing such as, for example, downconversion. The second sample stream is then provided to the FON egress buffer 636.

As illustrated in FIG. 6B, the FON ingress buffer 632 receives timing information for the GBBF clock ($T_{GBBF}$). As previously discussed, this timing information can be supplied separately, or it can be embedded within the received second sample stream. The FON ingress buffer 632 also receives the GPS clock ($T_{GPS}$). The depth monitor 638 monitors the status of the FON ingress buffer 632 in the same manner as the upstream, or forward, path discussed with respect to FIG. 6A. Specifically, the depth monitor 638 sends a control signal to the DCN ingress buffer 622 in order to indicate whether the FON ingress buffer 632 is above, or below, the predetermined thresholds ($T_{min}$, $T_{max}$).

The second sample stream is then transmitted from the FON egress buffer 636 to the DCN ingress buffer 622. The DCN ingress buffer 622 also receives both the GPS clock and the GBBF clock. Furthermore, according to at least one embodiment, the DCN ingress buffer 622 also receives a burst plan which determines the size and/or arrangement of burst within the second sample stream. The second sample stream is then converted into a first sample stream at the GPS clock rate. Since the GPS clock and the GBBF clock operate at different rates, the DCN ingress buffer 622 utilizes the control signal received from the depth monitor 638 in order to determine the appropriate time for adding samples to the first sample stream, and for dropping samples from the second sample stream. The first sample stream is then processed by the processing unit 624 and transmitted to the DCN egress buffer 624 at the GPS clock rate. The DSP 610 processes the first sample stream in order to generate a data stream that can be transmitted to the external networks.

Figure 7:
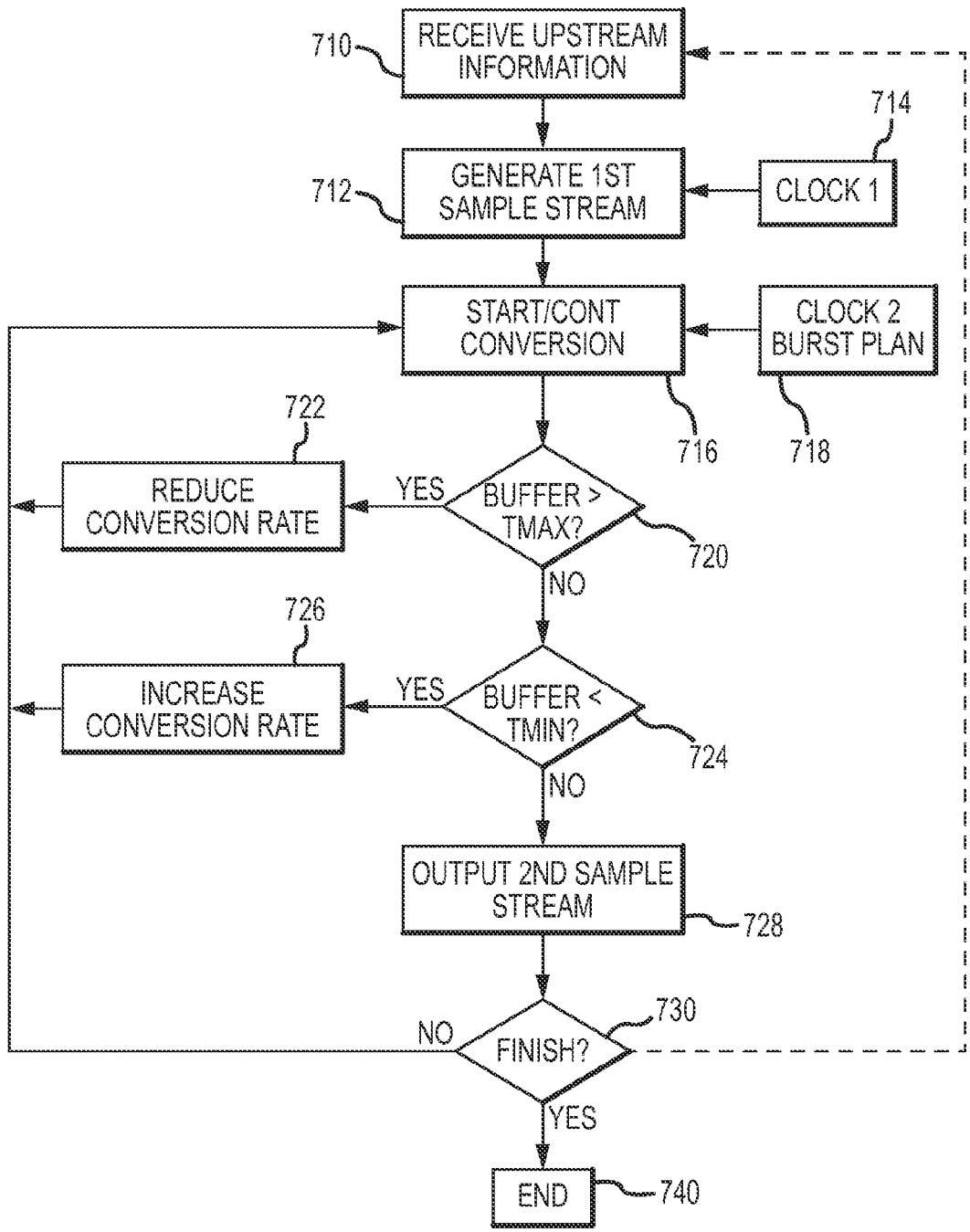
FIG. 7 is a flowchart illustrating the process for synchronizing communication, in accordance with at least one embodiment.

FIG. 7 is a flowchart illustrating the process for synchronizing communication in the upstream direction, in accordance with at least one embodiment. At 710 the upstream information is received by the apparatus. This corresponds to data from the various networks being processed by the PMC and provided, for example, to the communication unit. At 712, the communication unit generates the first sample stream. As previously discussed, this can be done by processing the upstream information to generate a sequence of bursts which represents data contained in the upstream information. The sequence of bursts is further arranged as the first sample stream. In addition, according to at least one embodiment, information pertaining to the first timing clock is provided to the communication unit at 714. Accordingly, the sequence of bursts forming the first sample stream is arranged based on the first clock signal.

At 716, the first sample stream is transmitted to the synchronization unit, and the process of converting to the second sample stream is initiated. According to at least one embodiment, the appropriate burst plan and/or second clock signal can be supplied to the synchronization unit at 718. As previously discussed, the second clock signal corresponds to the clock rate of a different communication system and differs from the first clock rate. Additionally, the burst plan can provide information indicating the size and arrangement of bursts within the second sample stream. At 720, a test is performed to determine whether or not the size of the buffer has exceeded a predetermined maximum threshold Tmax. As previously discussed, different embodiments allow for the buffer to be present in either the synchronization unit or the interface unit.

If the buffer size exceeds the predetermined threshold, the depth monitor issues a command, at 722, for reducing the rate at which samples are being converted. According to at least one embodiment, the synchronization unit interprets this command as a request to drop at least one sample from the first sample stream. Additionally, the sample (or samples) is dropped during the next guard period between bursts in the first sample stream. If the buffer size has not exceeded the maximum threshold, however, then another test is performed, at 724, in order to determine whether or not the buffer size has fallen below a predetermined minimum threshold Tmin.

If the buffer size has fallen below the minimum threshold, then the depth monitor issues a command, at 726, to increase the conversion rate. In response, the communication unit would cause an extra sample (or samples) to be added to the second sample stream during the next guard period between bursts in the first sample stream. The synchronization unit continues converting the first sample stream into the second sample stream, and the tests of the buffer level are continually repeated. At 724, however, if the size of the buffer has not fallen below the minimum threshold, the synchronization unit outputs the second sample stream to the interface unit. At 730, it is determined whether or not conversion of the first sample stream has been completed. If the conversion process has not been completed, then control returns to 716 where the synchronization unit continues to convert the first sample stream. Otherwise, if the first sample stream has been completely converted, then the process ends at 740.

While FIG. 7 illustrates the process ending at 740, it should be noted that this is only intended to illustrate certain details pertaining to synchronizing communication. Depending on the specific embodiment, communication can occur continuously. Rather than ending at 740, such embodiments can optionally determine whether the transmissions are continuous and return to 710 where the upstream information continues to be received and synchronized. Furthermore, control may simply return to 710, if it is determined that conversion of the first sample stream has been not been completed, as indicated by the broken line.

Figure 8:
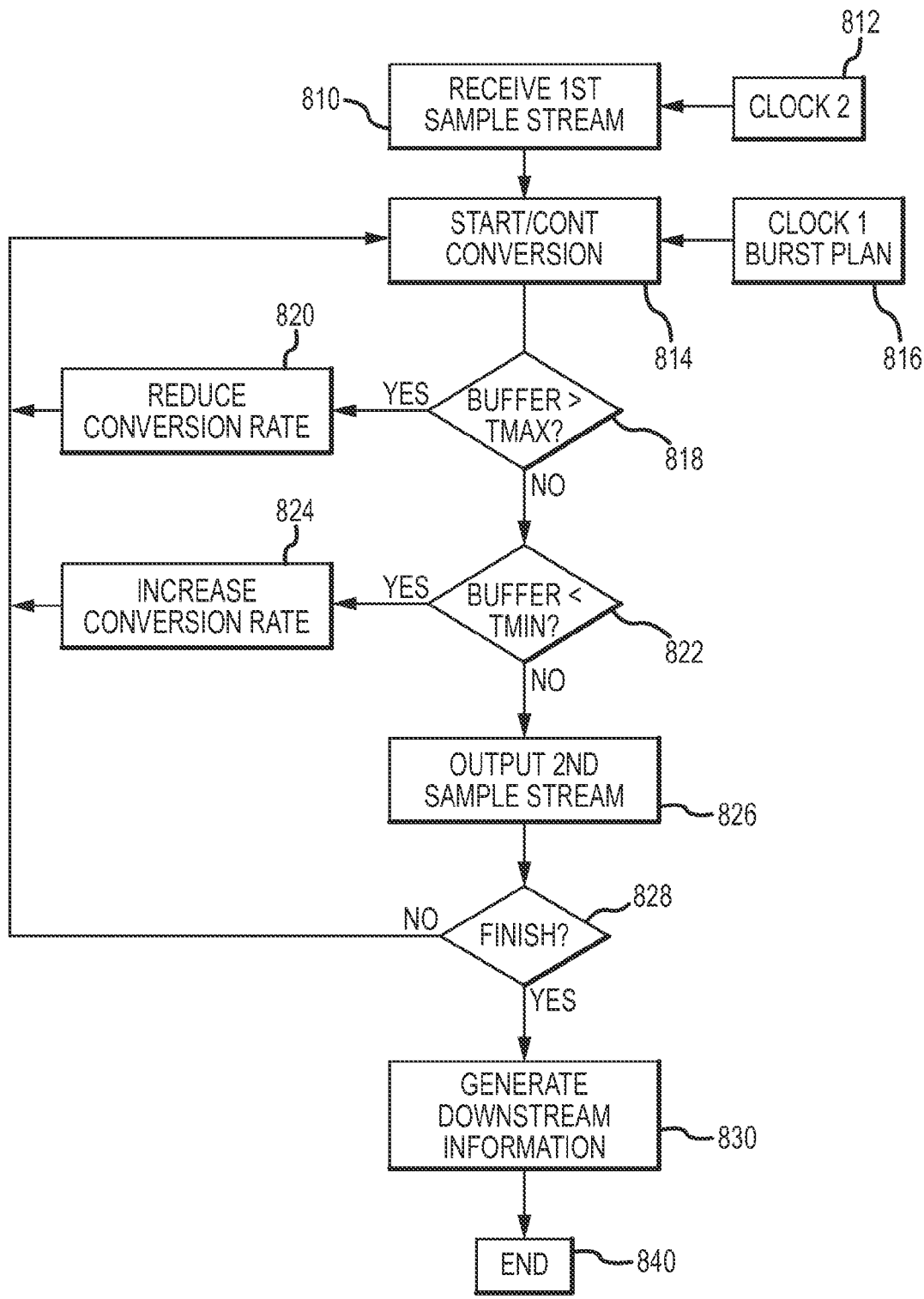
FIG. 8 is a flowchart illustrating the process for synchronizing communication, in accordance with another embodiment.

FIG. 8 is a flowchart illustrating the steps performed in synchronizing transmissions on a return path, in accordance with at least one embodiment. At 810, the first sample stream is received. This corresponds to information received by the interface unit from the communication system of a different service provider, such as a satellite communication system. For purposes of illustration, the data received is identified as the first sample stream. It should be noted, however, that this nomenclature is only used as a convenience for purposes of referencing the data stream with respect to the exemplary sequence of events on the return path. Thus, the first sample stream referenced at 810 corresponds to the second sample stream 460 in FIGS. 4A-4D.

According to at least one embodiment, the interface unit can receive the second clock signal ($T_{GBBF}$) at 812 in order to properly receive the samples contained within the first sample stream. According to other embodiments, the interface unit may decode the second clock signal ($T_{GBBF}$) based on information embedded within the first sample stream itself. According to still other embodiments, the interface unit may receive both the first clock signal as well as the second clock signal.

Upon receiving the first sample stream, the interface unit performs any necessary processing, and transmits the first sample stream to the synchronization unit for conversion at 814. The synchronization unit then begins the process of converting the first sample stream into a second sample stream at 814. According to the illustrated embodiment, the synchronization unit can receive the first clock signal ($T_{GPS}$), at 816, in order to generate the second sample stream at the first clock rate. As previously discussed, the clock rates can differ from one another. Furthermore, according to various embodiments the clock rates can vary such that one can be faster for a first period of time, but slower for another period of time. The burst plan for the first sample stream can also be received at 816 in order to properly extract the bursts while converting the first sample stream.

At 818, it is determined whether the buffer within the synchronization unit has exceeded a predetermined maximum threshold Tmax. As previously discussed, various embodiments provide for the buffer to be configured within either the synchronization unit or the interface unit. Furthermore, the depth monitor used to monitor the contents of the buffer can be provided within the synchronization unit or the interface unit. If the depth monitor determines that the size of the buffer has exceeded the predetermined maximum threshold Tmax, then a control signal is issued, at 820, to reduce the conversion rate. The control signal informs the synchronization unit that the first clock rate is faster than the second clock rate, and one or more samples should be dropped from the first sample stream at predetermined time periods. Such predetermined time periods can correspond to, for example, the next guard period occurring between bursts within the first sample stream. The samples can also be dropped, depending on various embodiments, from the beginning of a burst, end of a burst, or both. Accordingly, the synchronization unit would continue converting the first sample stream while dropping the necessary samples to reduce the conversion rate.

If the size of the buffer has not exceeded the maximum threshold level, then control passes to 822, where it is determined whether the size of the buffer has fallen below a minimum threshold Tmin. In this situation, the depth monitor would issue the control signal indicating that the conversion rate should be increased at 824. The synchronization unit would then insert a sample (or samples) within the second sample stream during the next guard period occurring between bursts within the first sample stream. If it is determined, at 822, that the buffer has not fallen below the minimum threshold, then the portion of the sample stream that has been converted is output at 826. At 828, it is determined whether the entire first sample stream has been converted. If so, then downstream information is generated from the second sample stream. This can correspond, for example, to the communication unit converting the first sample stream into a data stream that can be processed by the various external networks. If the conversion process has not been completed, however, then control returns to 814 were the synchronization unit continues the process of converting the first sample stream into the second sample stream. The process then and at 840.

Although the embodiments illustrated in FIGS. 7 and 8 provide various steps and comparisons for synchronizing the two sample streams, it should be noted that certain steps are continuously performed without stops in processing. For example, the first sample stream in FIG. 8 may be continually transmitted over time. Accordingly, the conversion process continues in a fluid manner while the depth monitor continues to monitor the size of the buffer. Additionally, the second sample stream is continually output to the communication unit so that the downstream information can be generated and output to the required networks. Thus, the process continues completely uninterrupted. Furthermore, the specific sequence of steps illustrated can vary, and certain steps can be performed optionally, or entirely omitted, without effecting performance of different embodiments. These steps therefore are intended to be sequence independent. The flowcharts are therefore only intended to be illustrative and in no way restrictive.

Although various embodiments have been described with respect to synchronization between two different clock rates, other embodiments can accommodate synchronization with one or even multiple clock rates. For example, the synchronization may be performed due to lag which occurs in a communication system operating on a single clock rate. In such embodiments, rather than losing user data or connection, burst placement and/or extraction can be used to absorb the lag. Systems that are primarily used to exchange data (e.g., cable modems) can implement burst placement/extraction according so such embodiments in order to synchronize data in a more streamlined manner than normally achievable through multiple requests for packet/sample retransmission. According to other embodiments, communication systems that transmit both voice and data can prioritize voice information and apply burst placement/extraction to synchronize data. As previously discussed, the buffer can be sized to accommodate system specifications and quality of service. Thus, the buffer can be sized to greater latency for data, while prioritizing voice transmissions.

According to other embodiments, multiple systems may be designed to operate at a common clock rate, but significant relative movement results in Doppler-shifted offsets from the common clock rate. These offsets can result in multiple clock rates within the same system. According to still further embodiments, two systems may operate on different clock rates, but relative movement between user terminals in one system causes a Doppler-shifted offset. Thus, synchronization may be required between (1) the designated clock rate of a first system and the user terminal that is in motion within the first system and (2) the first system and a second system operating at a different clock rate. Furthermore, the first (or second) system may have subsystems that operate at a different clock rate, thus requiring further synchronization. Individual systems may also prioritize information based on service type and apply synchronization based, at least in part, on factors used to establish the priority. Accordingly, the various embodiments discussed herein should not be construed as limiting. Rather, numerous embodiments can be implemented to provide synchronization between one or more clock rates.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. An apparatus comprising:
a communication unit for receiving upstream information and generating a first sample stream based on a first clock rate, the first sample stream being representative of the upstream information;
a synchronization unit for converting the first sample stream to a second sample stream based on a second clock rate, the second sample stream being configured as a plurality of sequential bursts arranged in accordance with a predetermined burst plan; and
an interface unit for receiving the second sample stream at the second clock rate and outputting the second sample stream in accordance with the predetermined burst plan,
wherein the synchronization unit is configured to perform at least one of dropping one or more samples contained in the first sample stream and adding one or more samples to the second sample stream, during a subsequent guard period within the first sample stream,
wherein the first clock rate is different from the second clock rate, and
wherein the first sample stream is converted based, at least in part, on predetermined guard periods within the first sample stream.

2. The apparatus of claim 1, wherein the upstream information received by the communication unit includes at least packet data, voice, voice over IP (VOIP), or a combination thereof.

3. The apparatus of claim 1, wherein the first clock rate is based on timing from Global Positioning Satellites (GPS).

4. The apparatus of claim 3, wherein the second clock rate is based on a Doppler-shifted offset to the timing from the GPS.

5. The apparatus of claim 1, wherein the interface unit outputs the second sample stream to a ground based beam former in a satellite transmission system.

6. The apparatus of claim 5, wherein the second clock rate is based, at least in part, on orbital drift of a satellite which communicates with the satellite transmission system.

7. The apparatus of claim 1, wherein the synchronization unit comprises:
an output buffer; and
a depth monitor for monitoring contents of the output buffer and generating a control signal for adjusting a rate at which the first sample stream is converted.

8. The apparatus of claim 7, wherein:
the depth monitor generates the control signal to indicate an increase in contents of the output buffer; and
the synchronization unit drops the one or more samples contained in the first sample stream based, at least in part, on the control signal generated by the depth monitor.

9. The apparatus of claim 7, wherein:
the depth monitor generates the control signal to indicate a decrease in contents of the output buffer; and
the synchronization unit adds the one or more samples to the second sample stream based, at least in part, on the control signal generated by the depth monitor.

10. The apparatus of claim 1, wherein:
the interface unit comprises:
an output buffer; and
a depth monitor for monitoring contents of the output buffer and transmitting a control signal indicative of the size of the output buffer, and
the synchronization unit adjusts a rate at which the first sample stream is converted based, at least in part, on the control signal.

11. An apparatus comprising:
an interface unit for receiving a first sample stream at a first clock rate, the first sample stream being configured as a plurality of sequential bursts arranged in accordance with a predetermined burst plan;
a synchronization unit for converting the first sample stream to a second sample stream based on a second clock rate; and
a communication unit for outputting downstream information representative of the second sample stream based on the second clock rate;
wherein the synchronization unit is configured to perform at least one of dropping one or more samples contained in the first sample stream and adding one or more samples to the second sample stream, during a subsequent guard period within the first sample stream, wherein the first clock rate is different from the second clock rate, and
wherein the first sample stream is converted based, at least in part, on predetermined guard periods within the first sample stream.

12. The apparatus of claim 11, wherein the synchronization unit comprises:
an input buffer; and
a depth monitor for monitoring contents of the input buffer and generating a control signal for adjusting a rate at which the first sample stream is converted.

13. The apparatus of claim 12, wherein:
the depth monitor generates the control signal to indicate an increase in contents of the input buffer; and
the synchronization unit drops the one or more samples contained in the first sample stream based, at least in part, on the control signal generated by the depth monitor.

14. The apparatus of claim 12, wherein:
the depth monitor generates the control signal to indicate a decrease in contents of the input buffer; and
the synchronization unit adds the one or more samples to the second sample stream based, at least in part, on the control signal generated by the depth monitor.

15. The apparatus of claim 11, wherein:
the interface unit comprises:
an input buffer, and
a depth monitor for monitoring contents of the input buffer and transmitting a control signal indicative of the size of the output buffer; and
the synchronization unit adjusts a rate at which the first sample stream is converted based, at least in part, on the control signal.

16. An apparatus comprising:
a communication unit for receiving upstream information and generating a first sample stream representative of the upstream information based on a first clock rate during a transmit process, and for outputting downstream information representative of the first sample stream based on the first clock rate during a receive process;
a synchronization unit for:
converting the first sample stream to a second sample stream based on a second clock rate during the transmit process, the second sample stream being configured as a plurality of sequential bursts arranged in accordance with a predetermined burst plan, and
converting the second sample stream to the first sample stream based on the first clock rate during the receive process; and
an interface unit for receiving the second sample stream at the second clock rate and outputting the second sample stream in accordance with the predetermined burst plan during the transmit process, and for receiving the second sample stream and supplying the second sample stream to the synchronization unit at the second clock rate and in accordance with the predetermined burst plan during the receive process,
wherein the synchronization unit is further configured to perform at least one of dropping one or more samples contained in the first sample stream and adding one or more samples to the second sample stream,
wherein the first clock rate is different from the second clock rate,
wherein, during the transmit process, the first sample stream is converted based, at least in part, on predetermined guard periods within the first sample stream, and
wherein, during the receive process, the second sample stream is converted based, at least in part, on predetermined guard periods within the second sample stream.

17. A method comprising:
generating a first sample stream representative of received upstream information, the first sample stream being based on a first clock rate;
converting the first sample stream, using a synchronization unit, to a second sample stream based on a second clock rate, the second sample stream being configured as a plurality of sequential bursts arranged in accordance with a predetermined burst plan; and
outputting the second sample stream, by an interface unit, in accordance with the predetermined burst plan,
wherein the converting includes at least one of dropping one or more samples contained in the first sample stream and adding one or more samples to the second sample stream, during a subsequent guard period within the first sample stream,
wherein the first clock rate is different from the second clock rate, and
wherein the converting is performed based, at least in part, on predetermined guard periods within the first sample stream.

18. The method of claim 17, wherein the outputting comprises outputting the second sample stream to a ground based beam former in a satellite transmission system.

19. The method of claim 18, wherein the second clock rate is based on orbital drift of a satellite which communicates with the satellite transmission system.

20. The method of claim 17, further comprising:
monitoring contents of an output buffer within the synchronization unit;
generating a control signal indicative of a size of the output buffer, and
adjusting a rate at which the first sample stream is converted based, at least in part, on the control signal.

21. The method of claim 20, wherein:
the control signal indicates an increase in contents of the output buffer; and
the one or more samples are dropped from the first sample stream based, at least in part, on the control signal.

22. The method of claim 20, wherein:
the control signal indicates a decrease in contents of the output buffer; and
the one or more samples are added to the second sample stream based, at least in part, on the control signal.

23. The method of claim 17, further comprising:
monitoring an output buffer within the interface unit; and
transmitting a control signal, to the synchronization unit, indicative of a size of the output buffer, and
adjusting a rate at which the first sample stream is converted based, at least in part, on the control signal.

24. A method comprising:
receiving, by an interface unit, a first sample stream at a first clock rate, the first sample stream being configured as a plurality of sequential bursts arranged in accordance with a predetermined burst plan;
converting the first sample stream, using a synchronization unit, to a second sample stream based on a second clock rate; and outputting downstream information representative of the second sample stream at the second clock rate;

wherein the converting includes at least one of dropping one or more samples contained in the first sample stream and adding one or more samples to the second sample stream, during a subsequent guard period within the first sample stream, wherein the first clock rate is different from the second clock rate, and wherein the converting is performed based, at least in part, on predetermined guard periods within the second sample stream.

25. The method of claim 24, further comprising:

monitoring contents of an input buffer within the synchronization unit;

generating a control signal indicative of a size of the input buffer; and adjusting a rate at which the first sample stream is converted based, at least in part, on the control signal.

26. The method of claim 24, wherein:
the control signal indicates an increase in contents of the input buffer; and
the one or more samples are dropped from the first sample stream based, at least in part, on the control signal.

27. The method of claim 24, wherein:
the control signal indicates a decrease in contents of the input buffer; and
the one or more samples are added to the second sample stream based, at least in part, on the control signal.

28. The method of claim 24, further comprising:
monitoring an input buffer within the interface unit; and
transmitting a control signal, to the synchronization unit, indicative of a size of the input buffer, and
adjusting a rate at which the first sample stream is converted based, at least in part, on the control signal.

29. The method of claim 24, wherein:
the bursts are further arranged in accordance with a TDMA protocol; and
one or more bursts extend across boundaries of TDMA frames.

* * * * *